UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

HALOGENATED DYE AND PROCESS OF MAKING SAME.

No. 837,775.　　　　Specification of Letters Patent.　　　　Patented Dec. 4, 1906.

Application filed May 18, 1906. Serial No. 317,615.

*To all whom it may concern:*

Be it known that I, OSCAR BALLY, doctor of philosophy and chemist, a citizen of the Swiss Republic, residing at Mannheim, in the Grand Duchy of Baden, German Empire, have invented new and useful Improvements in Halogenated Dyes and Processes of Making Same, of which the following is a specification.

I have discovered that coloring-matters such as can be obtained from compounds containing a benzanthrone grouping by treatment with alkali, and which are hereinafter termed "benzanthrone" coloring-matters, (see, for example, the specifications of Letters Patent Nos. 809,892, 811,471, and 818,336 and of the applications for Letters Patent, Serial Nos. 282,187 and 282,356,) either before or after treatment with a nitrating agent, (see, for example, the specification of Letters Patent No. 796,393,) can by treatment with a halogenizing agent—such, for instance, as halogen itself or sulfuroxychlorid—be converted into their halogen derivatives.

The new coloring-matters obtained in accordance with the present invention differ from the original coloring-matters both in shade and in their chemical reactions, being generally more easily converted into their leuco compounds in the vat. My new coloring-matters are claimed generically in Letters Patent No. 818,336, which claims the production of coloring-matters from a halogenated benzanthrone, and they possess the same general characteristics as the coloring-matters claimed in the said specification—that is to say, they are, when dry, powders ranging from dark violet to brown-violet, and are insoluble in water and in alcohol and are soluble in alkaline hydrosulfite. They are, however, superior to these latter in being more easily soluble in the vat, and therefore better suited for printing onto textile fiber and also in yielding clearer shades of violet. They are soluble in hot anilin, yielding from green to blue-violet solutions.

The following examples will serve to further illustrate the nature of my invention and the manner in which it can be carried into practical effect; but my invention is not confined to these examples. The parts are by weight:

Example 1: Suspend one (1) part of cyananthrene (the coloring-matter obtainable according to Example 1 of the specification of Letters Patent No. 809,892) in ten (10) parts of glacial acetic acid, add four (4) parts of bromin, and boil the whole in a reflux apparatus until the evolution of hydrobromic acid ceases. Allow the mass to cool, filter off the coloring-matter, wash it with glacial acetic acid, and dry it. The bromcyananthrene so obtained dissolves in concentrated sulfuric acid, yielding a dull-green solution. In hot nitrobenzene it is difficultly soluble, yielding a greenish solution with a brown-red fluorescence. It is soluble in hot anilin, yielding a blue-green solution, and it dissolves in alkaline hydrosulfite, yielding a blue solution which dyes cotton violet-blue shades.

Example 2: Suspend one (1) part of cyananthrene in ten (10) parts of nitrobenzene, and while at ordinary temperature add one (1) part of sulfuroxychlorid and then heat the mixture at a temperature of from sixty (60) to seventy (70) degrees centigrade until the evolution of hydrochloric acid ceases. Then precipitate by means of alcohol the chlorcyananthrene, filter it, wash it with alcohol, and dry it. This coloring-matter differs from that produced according to the foregoing Example 1 in that its solution in concentrated sulfuric acid is pure green and that its solution in hot anilin is greenish-blue. It dyes cotton blue-violet shades.

Example 3: Suspend one (1) part of cyananthene in ten (10) parts of nitrobenzene and while at a temperature of from sixty (60) to seventy (70) degrees centigrade pass a current of dry chlorin through the suspension until a test portion of the product after being precipitated by means of alcohol yields a greenish-blue solution in alkaline hydrosulfite. Then isolate the coloring-matter in the manner described in the foregoing Example 2. The coloring-matter yields a blue-green solution in concentrated sulfuric acid, and it is more easily soluble in nitrobenzene than are the coloring-matters prepared according to the foregoing examples, and in this solvent its solution is blue with a brown-red fluorescence. Its solution in hot anilin is blue and in alkaline hydrosulfite greenish-blue, and it dyes cotton a warm violet.

This invention is not limited to the use of nitrobenzene and of glacial acetic acid, as other indifferent suspension agents or solvents can be used, and instead of sulfur oxychlorid or chlorin or bromin other halogenizing agents may be used.

Instead of cyananthrene other coloring-matters, such as can be produced in the manner above mentioned from benzanthrones or from benzanthronequinolins can be employed. For instance, violanthrene (the coloring-matter obtainable according to the example of the specification of the application for Letters Patent Serial No. 282,217) when treated according to the methods given in the foregoing examples yields halogenated coloring-matters which dissolve in hot nitrobenzene, the solutions being from violet to violet-blue and having a brown-red fluorescence, the solutions in hot anilin being from green-blue to blue-violet. In alkaline hydrosulfite they yield from violet-red to green-blue vats which dye cotton shades varying from violet-blue to red-violet.

Now what I claim is—

1. The process for the production of coloring-matters containing halogen by treating a benzanthrone coloring-matter with a halogenizing agent.

2. The process for the production of coloring-matter containing halogen by treating cyananthrene with a halogenizing agent.

3. The process for the production of coloring-matter containing halogen by treating cyananthrene with chlorin.

4. As new articles of manufacture the coloring-matters containing halogen which can be obtained by treating a benzanthrone coloring-matter with a halogenizing agent, which coloring-matters dissolve in sulfuric acid yielding from violet to brown solutions, and in hot anilin yielding from green to blue-violet solutions, and which dissolve in alkaline hydrosulfite yielding blue to bluish-red vats which dye vegetable fiber substantively giving blue-violet to violet-blue shades.

5. As a new article of manufacture the coloring-matter containing halogen which can be obtained by treating cyananthrene with chlorin, which coloring-matter dissolves in sulfuric acid yielding a blue-green solution and in hot anilin yielding a blue solution and which dissolves in alkaline hydrosulfite yielding a greenish-blue vat which dyes vegetable fiber substantively giving violet shades.

In testimony whereof I have hereunto set my hand in the presence of two subscribing witnesses.

OSCAR BALLY.

Witnesses:
  J. ALEC. LLOYD,
  JOS. H. LEUTE.